United States Patent
Zhu et al.

(10) Patent No.: US 9,818,438 B1
(45) Date of Patent: Nov. 14, 2017

(54) SKEW COMPENSATION IN A PATTERNED MEDIUM

(71) Applicant: Seagate Technology LLC, Cupertino, CA (US)

(72) Inventors: Wenzhong Zhu, Apple Valley, MN (US); Gary E. Hillukka, Cokato, MN (US); Bin Huang, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/281,219

(22) Filed: Sep. 30, 2016

(51) Int. Cl.
| | |
|---|---|
| G11B 21/02 | (2006.01) |
| G11B 5/58 | (2006.01) |
| G11B 5/596 | (2006.01) |
| G11B 20/10 | (2006.01) |
| G11B 5/56 | (2006.01) |

(52) U.S. Cl.
CPC ............ *G11B 5/59627* (2013.01); *G11B 5/56* (2013.01); *G11B 20/10212* (2013.01)

(58) Field of Classification Search
CPC ..... G11B 5/4866; G11B 5/6082; G11B 5/314; G11B 5/0021; G11B 11/10534; G11B 11/1058; G11B 2005/0002; G11B 5/3903; G11B 5/6005; G11B 5/59633; G11B 5/58; G11B 5/584; G11B 5/4894; B82Y 10/00; B82Y 25/10543
USPC .... 360/59, 328, 313, 125.03, 125.12, 234.3, 360/31, 75, 77.01
See application file for complete search history.

(56) References Cited

U.S. PATENT DOCUMENTS

| | | |
|---|---|---|
| 6,421,197 B1 | 7/2002 | Abdelnour |
| 6,504,675 B1 * | 1/2003 | Shukh .................. G11B 5/1278 360/125.12 |
| 8,724,242 B2 * | 5/2014 | Gao ....................... G11B 5/012 360/31 |
| 8,773,796 B2 | 7/2014 | Hirano et al. |
| 8,792,200 B1 | 7/2014 | Tam et al. |
| 8,848,314 B2 * | 9/2014 | Albrecht ................ G11B 5/596 360/125.03 |
| 8,902,536 B1 | 12/2014 | Hwang et al. |
| 9,007,540 B2 | 4/2015 | Nakagawa |
| 9,087,540 B1 | 7/2015 | Lee et al. |

(Continued)

OTHER PUBLICATIONS

Michael A. Cordle, Drew M. Mader, Steven D. Granz, Alfredo S. Chu, Pu-Ling Lu, Frank Martens, Ying Qi, Tim Rausch, Jason W Riddering and Kaizhong Gao, "Radius and Skew Effects in an HAMR Hard Disk Drive," IEEE Transactions on Magnetics, Feb. 2016, pp. 1-7, vol. 52, No. 2, IEEE, US.

(Continued)

*Primary Examiner* — Nabil Hindi
(74) *Attorney, Agent, or Firm* — Hall Estill Attorneys at Law

(57) ABSTRACT

A system may compensate for skew in a patterned medium, such as but not limited to a self-assembling bit patterned medium, with a write pole separated from a data storage medium by an air bearing. The write pole being connected to a controller. The data storage medium can have a plurality of magnetic islands arranged in data tracks with each data track having a track center. The write pole may be selectively shifted from the track center by the controller to compensate for a skewed write pole configuration.

20 Claims, 4 Drawing Sheets

(56) References Cited

U.S. PATENT DOCUMENTS

| | | | |
|---|---|---|---|
| 2008/0231985 A1* | 9/2008 | Okamoto | G11B 5/1278 360/75 |
| 2014/0153134 A1* | 6/2014 | Han | G11B 5/012 360/234.3 |
| 2016/0148630 A1 | 5/2016 | Rausch | |

OTHER PUBLICATIONS

Jian-Gang Zhu and Hai Li, "Understanding Signal and Noise in Heat Assisted Magnetic Recording," IEEE Transactions on Magnetics, Feb. 2013, pp. 765-772, vol. 49, No. 2, IEEE, US.

* cited by examiner

SKEW COMPENSATION IN A PATTERNED MEDIUM

SUMMARY

A data storage system, in accordance with various embodiments, compensate for skew in a patterned medium. The data storage system separates a write pole from a data storage medium by an air bearing with the write pole being connected to a controller. The data storage medium has a plurality of magnetic islands arranged in data tracks with each data track having a track center. The write pole is selectively shifted from the track center by the controller to compensate for skew of the write pole.

DETAILED DESCRIPTION

Consumer and industry demand for data storage devices with higher data capacity has emphasized the accuracy and reliability of data accesses, such as data writing to a rotating data storage medium. As data accessing components, such as a data writer, moves relative to a data storage medium, the component becomes skewed, which can degrade data writing accuracy. In high data capacity devices where data bits are closely oriented in data tracks with smaller pitches, component skew can result in high error rates, and reduced data capacity. Hence, there is a continued goal in mitigating the effects of component skew in data storage devices, particularly in devices with high data capacity.

To address the effects of component skew, the write center of a transducing head is offset from a data track center. By selectively offsetting the write pole from a data track center, the magnetic extent of the write pole can be controlled to preserve the integrity of data stored in data tracks adjacent to the skewed write pole.

Figure 1:
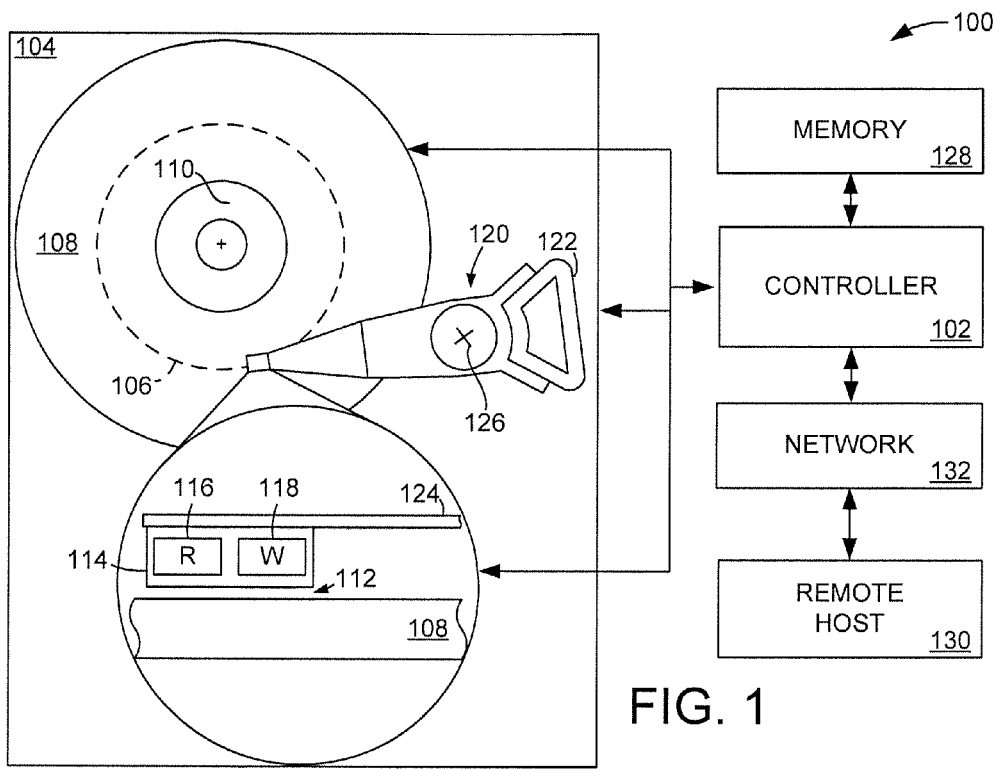
FIG. 1 represents various aspects of an example data storage system configured and operated in accordance with various embodiments of the present disclosure.

FIG. 1 illustrates an example data storage system 100 where various embodiments of skew compensation can be employed. The system 100 has at least one local controller 102, which may be positioned internal or external, to one or more data storage devices 104. The controller 102 can direct data storage operations to, and from, data tracks 106 of the data storage medium 108 while it rotates about a central spindle 110. Rotation of the data storage medium 108 creates an air bearing 112 on which a transducing head 114 rides to position at least one data reader 116 and data writer 118 over a selected data track 106, as directed by the local controller 102 and executed by the actuator 120.

Although actuation of the transducing head 114 can be achieved in a variety of means, some embodiments utilize a voice coil motor 122 to move an actuator arm 124 about an actuation pivot 126. Operation of the actuator 120 allows data to flow into, and out of, the data storage medium 108 from one or more local memories 128. A local memory 128 can be volatile or non-volatile and physically positioned in or proximal to the data storage device 104. It is contemplated that the local controller 102 and/or memory 128 are supplemented by one or more remote hosts 130 that are physically separated from the data storage device 104, such as in a different city, state, or country, and connected via a wired and/or wireless network 132.

Figure 2A:
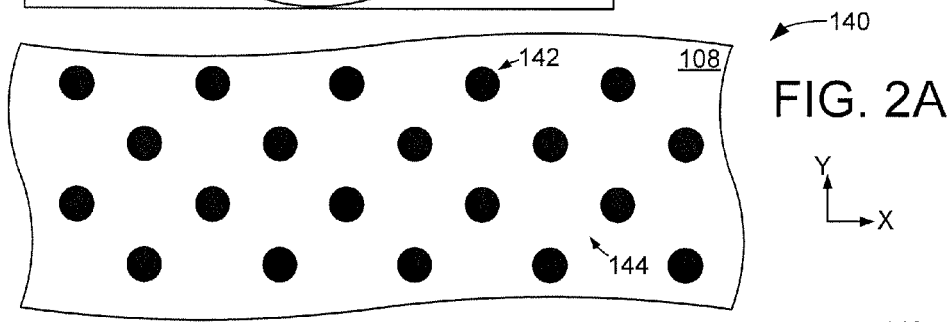
FIGS. 2A-2B depict a self-assembling bit patterned medium (BPM) that can be used in the system of FIG. 1 in accordance with some embodiments.
Figure 2B:
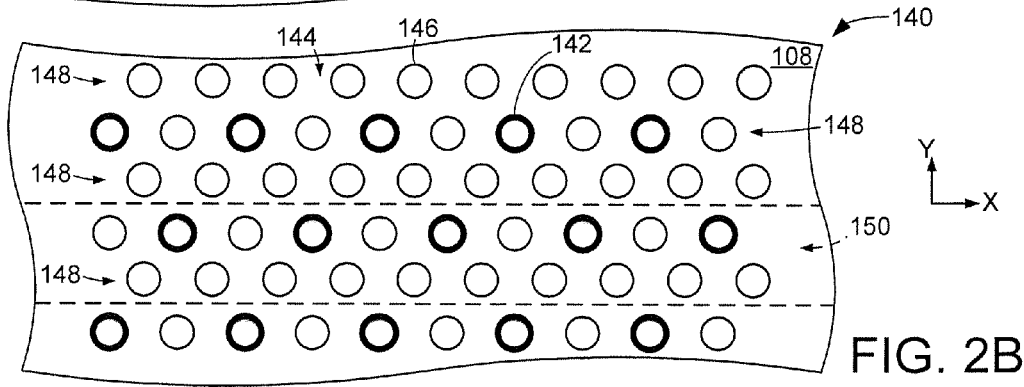

While the rotating data storage medium 108 can store data in a diverse variety of configurations, such as longitudinal, perpendicular, shingled, interlaced, and discrete data recording, assorted embodiments are directed to bit patterned media (BPM) where data is stored in predetermined magnetic domains in, or on, a recording surface of the data storage medium 106. FIGS. 2A and 2B respectively provide top view line representations of portions of an example BPM 140 that can be utilized in the data storage system 100 of FIG. 1.

The BPM 140 is characterized as a self-assembled bit pattern medium with an array of alignment features 142 spaced apart and separated by a non-magnetic material 144 on a surface of the BPM 140, as shown in FIG. 2A. The alignment features 142 are written using a suitable lithographic process in an alignment feature pattern that may be hexagonal or some other geometric arrangement. To construct the BPM 140 of FIG. 2B, a layer of self-assembling material is applied to the substrate before an activation process supplies energy to the substrate through the application of heat and/or a chemical treatment that causes the material to self-assemble into a series of spaced apart data recording dots 146 that are each capable of storing a magnetic domain. As such, the alignment features 142 guide the final alignment of the data recording dots 146. It is noted that the self-assembling material can take a variety of forms, such as a copolymer with components that are respectively chemically attracted to/repelled by the alignment features and the dots 146 can take a variety of geometric shapes such as spheres, cylinders, etc.

The dots 146 are formed on top of each of the alignment features 142, as well as between adjacent pairs of the features 142. The dots 146 may be larger than, smaller than or nominally the same size as the alignment features 142. The dots 146 may take the same shape as, or a different shape from, the alignment features 142. While only a single dot 146 is shown between each adjacent pair of features 142, multiple dots can be formed between adjacent features. In some cases, from two (2) to ten (10) dots or more are formed between adjacent alignment features depending upon a number of factors such as the arrangement of the features, the composition of the self-assembling material, etc.

The dots 146 comprise localized regions of magnetizable material suitable for the storage of data. A contiguous layer of non-magnetic material 144 surrounds each dot 146 to magnetically isolate the individual dots. The dots 146 are generally arranged into circumferentially extending, concentric rows 148. In some embodiments, each pair of rows 148 forms a track (hypertrack) 150. It is contemplated that any number of rows can be used to form tracks. Hypertracks made up of two rows will be understood as including an "even" row and an "odd" row of dots. It will be understood that the self-assembly process can be applied directly to each recording medium, or can be applied to a template which is then transferred to individual recording media.

At this point it will be noted that arcs of concentric circular tracks, when viewed at a scale where the field of view is very small compared to the radii of the arcs, resemble parallel lines. Correspondingly, the figures presented herein depicting features at such scale are drawn with the recording dots of adjacent tracks along parallel lines, and to simplify descriptions, the text herein refer to "rows" of dots, which, in reality, are actually concentric arc segments.

Figure 3:
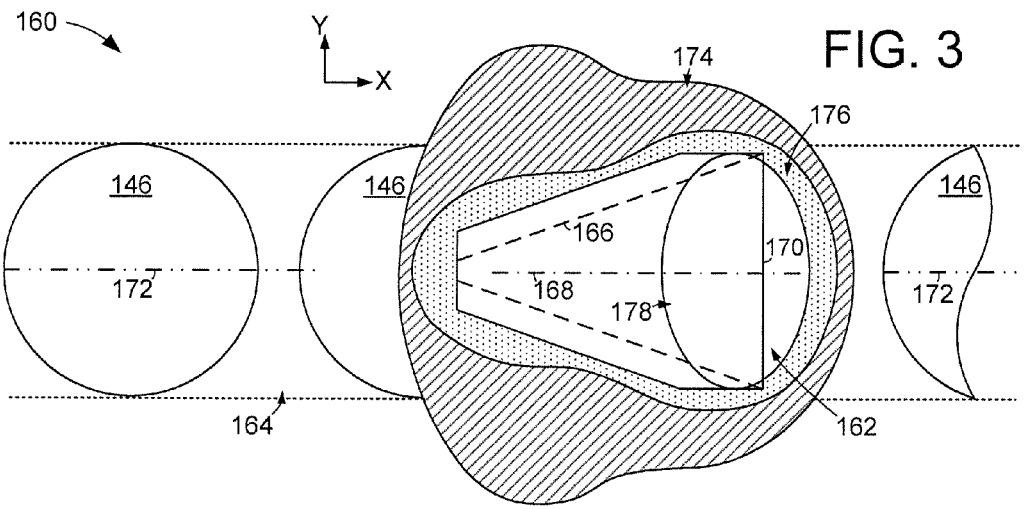
FIG. 3 is a top view line representation of a portion of an example data storage device that may be employed in the data storage system of FIG. 1.

FIG. 3 is a top view line representation of a portion of an example data writer 160 that may be used to program data to one or more data dots 146 in a data storage system in accordance with various embodiments. The data writer 160 has a main write pole 162 that has a trapezoidal shape, but can have a variety of different shapes and sizes to write magnetic data to a data track 164, which may be a hypertrack 150 of multiple rows of data dots 146. For example, the write pole 162 has segmented sidewalls 166 that correspond with a different trapezoidal pole configuration. The shape of the write pole 162 dictates the position of a longitudinal axis 168 parallel to an elongated side of the write pole 162, and the X axis.

It is noted that the longitudinal axis 168 corresponds with a symmetric centerline of the write pole 162 and, in some embodiments, corresponds with the midpoint of the trailing edge 170 of the write pole 162. When the write pole 162 is not skewed relative to the data track 164, the longitudinal axis 168 is parallel and aligned with a track centerline 172 that corresponds with the center of a plurality of data dots 146. In many recording schemes, such as shingled, interlaced, longitudinal, and perpendicular recording, the location of the write pole 162 sets the center of a data track. However, in BPM environments, the center of a multiple data dots 146, usually in a radial path around a spindle, defines a data track. As such, the write center of the write pole 162 can be offset and different from the track centerline 172.

For high speed data writing, the write pole 162 can be operated in a manner that produces magnetic field gradients outside the areal extent of the write pole 162, as illustrated by shaded regions 174 and 176 as well as by circle 178. That is, write current amplitude and duration may be tuned to provide operational benefits, such as increased switching time and reduced noise, but at the cost of having a variety of different magnetic field regions on and around the write pole 162.

Figure 4A:
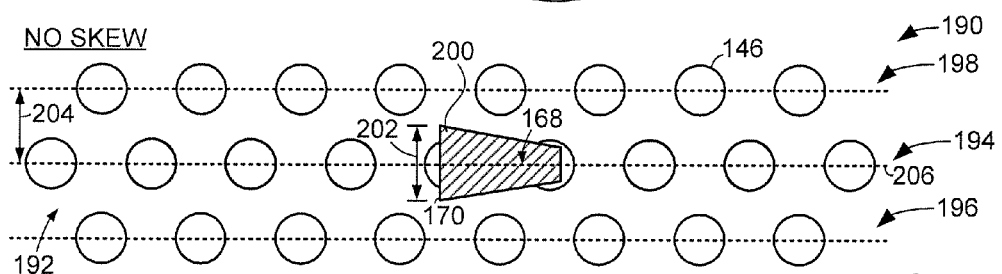
FIGS. 4A-4C respectively display portion of an example data storage device utilized in the data storage system of FIG. 1.
Figure 4B:
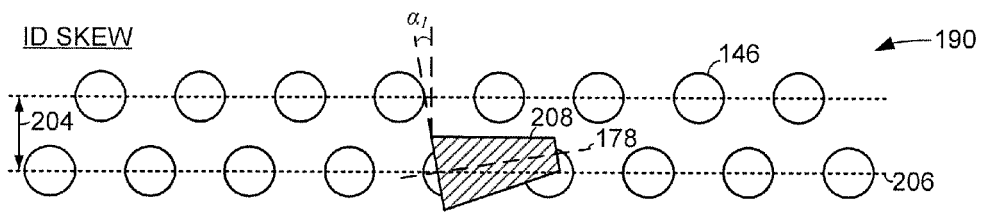
Figure 4C:
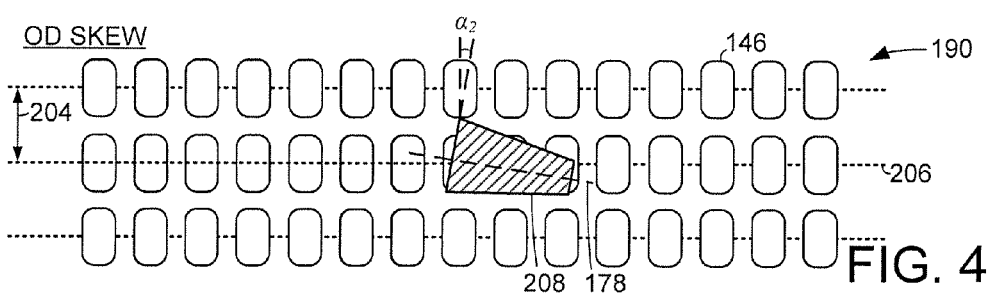

FIGS. 4A-4C respectively depicts top view line representations of portions of an example data storage device 190 to illustrate the effects of write pole skew. FIGS. 4A and 4B each show a BPM medium, as indicated by the data dots 146 separated by non-magnetic material. A single data track 192, or hypertrack 150, is represented by the collective three rows of data dots, although it will be appreciated that numerous additional tracks are provided adjacent the depicted track.

The data track 192 is formed from a first subtrack 194 disposed between second 196 and third 198 subtracks. The respective subtracks 194, 196, and 198 are each made up of rows of spaced apart data dots 146. The data dots 146 are evenly spaced so that each dot 146 in the odd subtrack 194 is located between two adjacent dots in the even subtracks 196/198, and vice versa. While not limiting, individual bits in an input write sequence can be written to individual data dots 146 so that the written sequence alternates between the odd subtracks 194 and even subtracks 196/198. For example, data dots 146 may be aligned and non-circular, such as having a substantially rectangular shape and alignment shown in FIG. 4C.

A write pole 200 of a data writer is hydrodynamically supported atop an air bearing to be separated from the underlying BPM where the data dots 146 reside. The write pole 200 has a write width 202, as represented by the Y axis length of the trailing pole edge 170. The write width 202 is tuned to be less than the track pitch 204 to allow the write pole 200 to write data to an individual subtrack. As shown in FIG. 4A, there is no skew when the longitudinal axis 168 of the write pole 200 is parallel and aligned with the subtrack centerline 206 defined by the center of the subtrack data dots 146. It is contemplated that when no skew is present, the magnetic fields (regions/gradient) of the write pole 200 have a low risk of producing ATI due at least in part to symmetric fringe fields about the pole longitudinal axis 168.

However, when the orientation of the write pole 200 is skewed relative to an underlying data track 192, and/or subtrack, portions of the write pole 200 can be closer to one subtrack or another, which corresponds with fringe magnetic fields being stronger on one side of the write pole 200. FIG. 4B conveys how write pole skew towards the inner diameter (ID) of the underlying BPM can place portions of the write pole 200 closer to the third subtrack 198 than the second subtrack 196. The skew of the write pole 200 can be quantified by the first skew angle $\alpha_1$ relative to the subtrack centerline 206. Conversely, a second skew angle $\alpha_2$ is produced when the write pole 200 is moved towards the outer diameter (OD) of the underlying BPM. Such OD skew shown in FIG. 4C corresponds with higher ATI due to the orientation and proximity of the write pole sidewall 208 to the second subtrack 196. That is, the parallel orientation of the pole sidewall 208 with the subtrack centerline 206, along with the relatively short distance between the pole 200 and data dots 146 of the second subtrack 186, increase the risk of ATI and data degradation in the second subtrack 196.

It is noted that the orientation of the pole sidewall 208 is not required to be parallel to the subtrack centerline 206 to increase the risk of ATI. In yet, the combination of separation distance 204 and sidewall 208 orientation relative to the subtrack centerline 206 are large contributors to the risk of ATI. With alternative recording schemes, a write center cannot be moved relative to a track center. For instance, in perpendicular recording, asymmetric data track distribution cannot be produced that supports random writes, in shingled recording, writing occurs in a single direction that has less ATI, and in interlaced recording, a write center can only be moved for one layer (top or bottom).

Figure 5A:
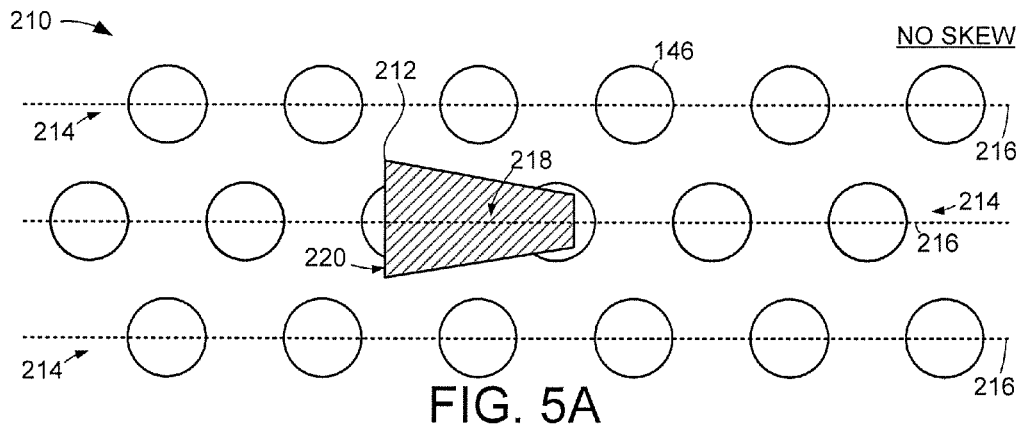
FIGS. 5A-5C respectively show portions of an example data storage device configured in accordance with assorted embodiments to compensate for skew.
Figure 5B:
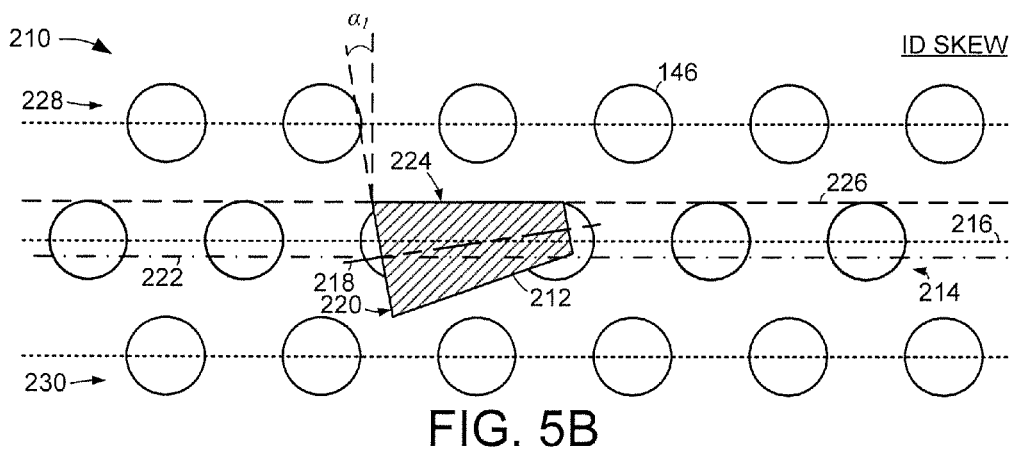
Figure 5C:
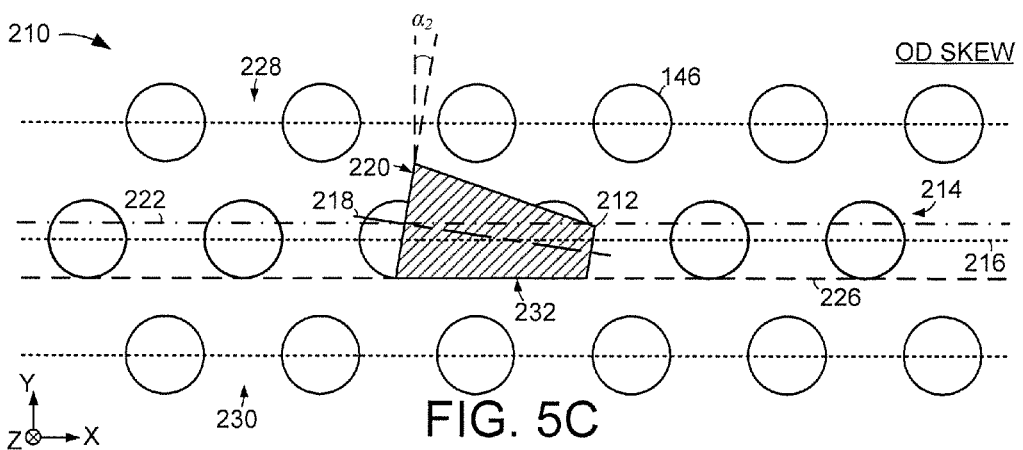

To clarify, data tracks, including subtracks, in BPM cannot be altered at will, such as by offsetting the location of the write pole 200 relative to the pole's location on the underlying medium. The inability to compensate for skew by asymmetrically configuring data tracks has rendered various embodiments to compensate for write pole 200 skew by offsetting the data track centerline from the write centerline, which may position a pole sidewall 208 in alignment with an outer boundary of the data dots of the data track being written. FIGS. 5A-5C respectively illustrate top view line representations of an example data storage device 210 that compensates for skew in a BPM environment in accordance with assorted embodiments.

In FIG. 5A, a trapezoidal shaped write pole 212 travels left-to-right to write data to data dots 146 of a BPM. The data dots 146 are arranged in tracks 214 respectively defined by track centers 216. The parallel orientation of the longitudinal axis 218 of the write pole 212 to the track center 216 of the track 214 comprising data dots 146 directly under the write pole 212 indicates there is no actuator skew. The lack of skew is also indicated by the perpendicular orientation of the trailing pole edge 220 with the track center 216 of the track 214 the pole 212 is accessing. With no skew, the write pole 212 can switch between magnetic polarities and write data to the data dots 146 with minimal risk of ATI to the adjacent, non-selected, tracks 214.

As shown in FIG. 4B, ID skew can position the write pole 212 in close proximity to an unselected track 214 and increase the risk of disturbing the stored magnetic polarity in the data dots 146 of the unselected track 228/230. Accordingly, various embodiments shift the write centerline 222 from the track centerline 216, which can align a sidewall 224 with the outer boundary 226 of the data dots 146 of the selected track 214, as shown in FIG. 5B. In other words, when the longitudinal axis 218 of the write pole 212 is canted to the selected track center 216 ($\alpha_1$) due to actuator skew, the write pole 212 is shifted so that a write centerline 222 is offset from the track centerline 216, which can correspond with the outer sidewall 224, distal the center of the underlying BPM, being parallel with an outer edge/boundary 226 of the data dots 146 of the selected data track 214.

The movement of the write centerline 222 can provide ATI that is symmetric for the data track. That is, offsetting the data writing centerline 222 from the track centerline 216 compensates for the shape of the write pole 200 and the actuator skew by effectively making ATI symmetric for the selected data track 214. Alignment of the sidewall 222 and dot outer boundary 224 by offsetting the write and track centerlines increases the distance between the write pole 212 and the data dots 146 of a first unselected track 228 while decreasing the distance between an inner side of the write pole 212 with the data dots 146 of a second unselected track 228. Hence, the physical shifting of the write pole 212 moves the pole 212 closer to one track 230 and farther away from another track 228 to balance the risk of ATI to both unselected tracks 228/230.

Skew effects due to actuation towards the OD can similarly be mitigated by aligning an inner sidewall 232 with the outer boundary 226 of the underlying data dots 146, as shown in FIG. 5C. The adjustment of the write pole 212 away from the track center 216 allows a majority of the write pole to pass over the data dots 146 of the selected track 214 while diminishing the risk of ATI and degradation of non-selected data dots 146 by increasing the space from the inner sidewall 232. It is noted that the alignment of the outer 224 or inner 232 sidewalls of the write pole 212 with the dot outer boundary 226 involves the sidewalls being parallel to the boundary 226 along the X axis and flying over the boundary 226 along the Z axis.

It is contemplated that some pole skew angles can be compensated by shifting the outer sidewall 224, in the case of skew towards the ID, or inner sidewall 232, in the case of skew towards the OD, slightly away from the dot outer boundary 226. That is, skew may be compensated by aligning a pole sidewall 224/232 parallel and offset from the dot outer boundary 226. The ability to adjust the placement of the write pole 212 to compensate for actuator skew without changing the location of the underlying track 214 or data dots 146 allows for intelligent balancing of risk of ATI with the speed and accuracy of programming data to the selected track 214. The shifting of the write pole 212 away from the data track center 216 can also compensate for a variety of fabrication variations, such as dot misalignment, repeated run-out, and transducing head tracking errors.

Figure 6:
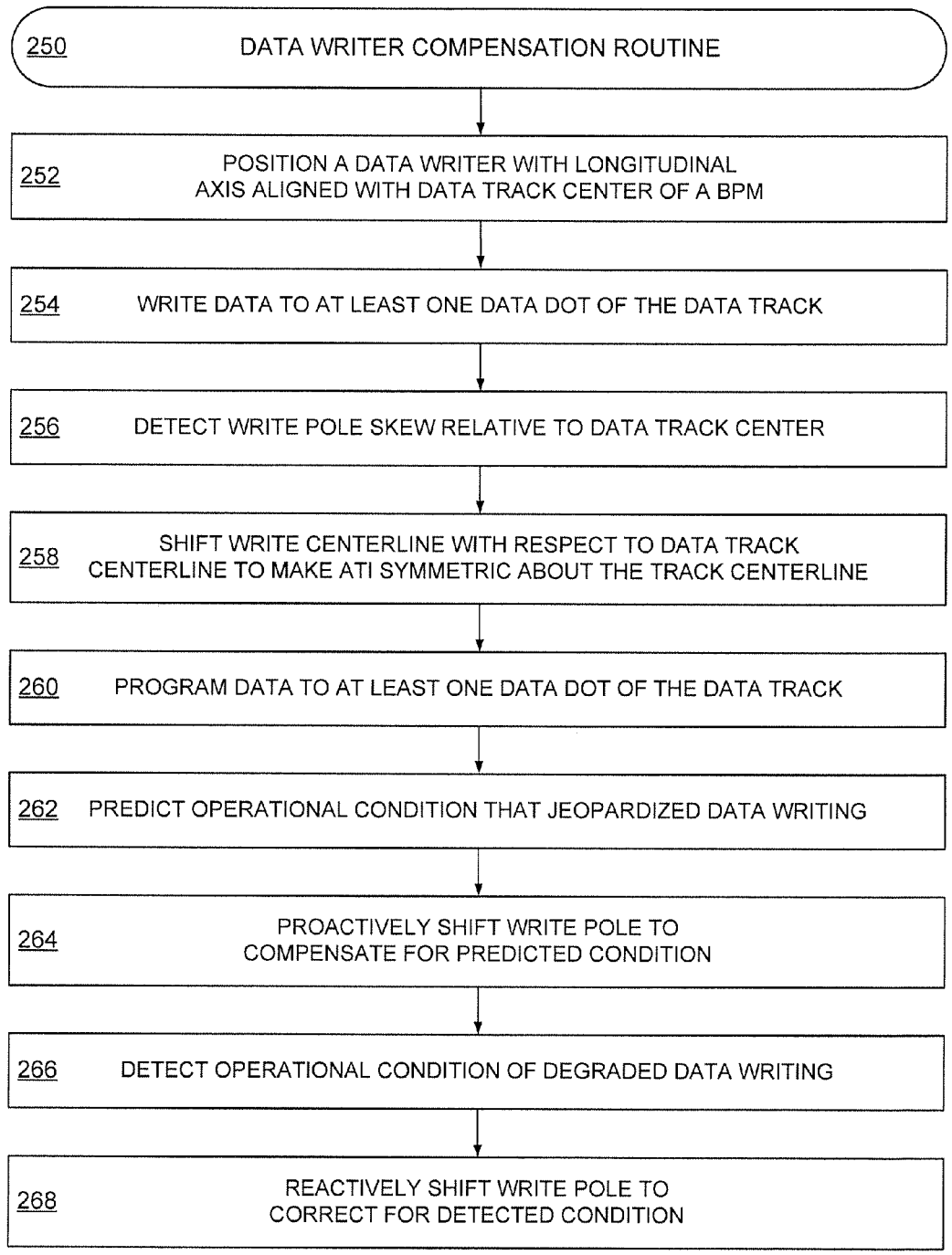
FIG. 6 is a flowchart of an example data writer compensation routine that can be carried out in the data storage system of FIG. 1 in accordance with some embodiments.

FIG. 6 is a flowchart of an example data writer compensation routine 250 that can be executed by the data storage system 100 in accordance with some embodiments. Initially, the compensation routine 250 aligns a longitudinal axis of a write pole portion of a data writer with the data track center of a selected data track of a BPM in step 252 prior to writing at least one data dot in step 254. Skew of the write pole is detected in step 256, which triggers step 258 to shift the position of the write centerline relative to the data track center to make ATI symmetric about the data track center. It is noted that the shifting of the write centerline may position an outer, or inner sidewall of the write pole in alignment with an outer boundary of the data dots of the selected data track.

With the skew angle of the write pole compensated by shifting the pole to align a sidewall with the outer boundary of the underlying data dots, as directed by a local and/or remote controller, step 260 programs data while the write pole is shifted. It is noted that the shifted write pole position can be maintained, adjusted, or returned to a non-skew configuration while the BPM remains operational. In some embodiments, the write pole position is adjusted to proactively compensate for operational issues predicted in step 262. That is, the local controller can evaluate operational parameters, such as temperature, bit error rate, data writing speed, and occurrence of vibration, to predict increased susceptibility to write pole skew effects, such as ATI.

The prediction of a detrimental operational condition causes step 264 to proactively shift the write pole position from the data track center to reduce the risk of data writing and reading errors. While proactive operational correction can be practiced, various embodiments can also correct for detected operational conditions in steps 266 that identifies an operational issue and step 268 that adjusts the write pole to compensate for the operational issue. It is contemplated that the reactive correction of operational issues in steps 266 and 268 can be practiced alone, before, or after the proactive correction of operational issues in steps 264 and 266. It is also contemplated that a data reader can be shifted relative to a data track center to compensate and/or correct for operational conditions that jeopardize accuracy and speed of data accesses.

Through the various embodiments, the effects of skew in a BPM can be compensated intelligently and without taking the data storage system offline. The ability to proactively and/or reactively shift a write pole away from a data track center arranges the thermal and magnetic profile of the write pole to minimize the risk of ATI to non-selected data tracks. By maintaining the data track center in-place throughout skew compensation, write pole shifting can be accomplished quickly and accurately without having to adjust data track tracking information, such as servo, error correction codes, and runout data.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising a write pole separated from a data storage medium by an air bearing and connected to a controller, the data storage medium having a plurality of magnetic islands arranged in a data track having a track center, the write pole selectively shifted from the track center to align a write pole sidewall directly over an outer boundary of the plurality of magnetic islands of a selected data track, the outer boundary aligned parallel to the track center.

2. The apparatus of claim 1, wherein the write pole has a trapezoidal shape.

3. The apparatus of claim 1, wherein a leading edge of the write pole has a non-parallel and non-perpendicular orientation relative to the track center.

4. The apparatus of claim 1, wherein the track center continuously passes through a center of each magnetic island of the plurality of magnetic islands.

5. The apparatus of claim 1, wherein the write pole sidewall is parallel to and vertically aligned with the outer boundary.

6. The apparatus of claim 1, wherein the write pole sidewall is proximal an inner diameter of the data storage medium.

7. The apparatus of claim 1, wherein the write pole sidewall is proximal an outer diameter of the data storage medium.

8. An apparatus comprising a write pole separated from a data storage medium by an air bearing and connected to a controller, the data storage medium having a plurality of magnetic islands arranged into first, second, and third data tracks, each data track having a track center, the write pole selectively shifted from the track center by the controller to align a write pole sidewall directly over an outer boundary of the plurality of magnetic islands of the first data track to compensate for write pole skew, the outer boundary aligned parallel to the track center and extending along multiple adjacent magnetic islands.

9. The apparatus of claim 8, wherein the shifted write pole sidewall is parallel to and separated from the track center of the first data track.

10. The apparatus of claim 8, wherein a longitudinal axis of the write pole is canted at a non-zero angle with respect to the track center of the first data track.

11. The apparatus of claim 8, wherein the shifted write pole is physically closer to magnetic islands of the second data track than to magnetic islands of the third data track.

12. The apparatus of claim 11, wherein the first data track is disposed between the second and third data tracks.

13. The apparatus of claim 11, wherein the write pole sidewall is parallel to the track center of the first, second, and third data tracks concurrently.

14. A method comprising:
positioning a write pole across an air bearing from a data storage medium by an air bearing, the write pole connected to a controller, the data storage medium having a plurality of magnetic islands arranged in first, second, and third data tracks, each data track having a track center;
generating a bit error rate of the data storage medium; and
shifting the write pole from the first track center as directed by the controller in response to the generated bit error rate.

15. The method of claim 14, wherein the write pole sidewall is angled at a non-zero, non-perpendicular orientation with respect to the track center of the first, second, and third data tracks prior to being shifted.

16. The method of claim 14, wherein the track center is separated from and different than a longitudinal axis of the write pole.

17. The method of claim 14, wherein the controller shifts the write pole proactively after an operational condition is predicted.

18. The method of claim 14, wherein the controller shifts the write pole reactively after an operational condition is detected.

19. The method of claim 14, wherein the write pole is shifted by the controller to align a longitudinal axis of the write pole with the track center of the first data track subsequent to the shifting step.

20. The method of claim 14, wherein the write pole is shifted to be closer to magnetic islands of the second data track than magnetic islands of the third data track, the first data track disposed between the second and third data tracks.

* * * * *